(12) United States Patent
Harris et al.

(10) Patent No.: US 11,264,825 B1
(45) Date of Patent: Mar. 1, 2022

(54) VEHICLE TO VEHICLE HIGH POWER CHARGING

(71) Applicant: FORD GLOBAL TECHNOLOGIES, LLC, Dearborn, MI (US)

(72) Inventors: Timothy Harris, Grosse Ile, MI (US); Michael John O'Connor, Keego Harbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/007,525

(22) Filed: Aug. 31, 2020

(51) Int. Cl.
*H02J 7/34* (2006.01)
*B60L 53/65* (2019.01)
*B60L 53/22* (2019.01)
*B60L 53/14* (2019.01)

(52) U.S. Cl.
CPC .............. *H02J 7/342* (2020.01); *B60L 53/14* (2019.02); *B60L 53/22* (2019.02); *B60L 53/65* (2019.02)

(58) Field of Classification Search
CPC .......... H02J 7/342; B60L 53/14; B60L 53/22; B60L 53/65; B60L 2210/12; B60L 2210/14
USPC ........................................................ 320/104
See application file for complete search history.

(56) References Cited

U.S. PATENT DOCUMENTS

| 10,185,977 B2 | 1/2019 | Khoo et al. | |
| 11,077,763 B2* | 8/2021 | Pogorelik | B60L 53/665 |
| 2013/0175973 A1* | 7/2013 | Jones | B60L 3/0046 320/105 |
| 2020/0262305 A1* | 8/2020 | Chakraborty | B60L 53/18 |

FOREIGN PATENT DOCUMENTS

WO 2014/143006 A1 9/2014

\* cited by examiner

*Primary Examiner* — Paul Dinh
(74) *Attorney, Agent, or Firm* — David B Kelley; Brooks Kushman P.C.

(57) ABSTRACT

A vehicle charger includes two charge connectors configured to couple with DC charge ports of two vehicles each having a battery, a buck boost converter connected between the two charge connectors configured to convert a first DC voltage to a second DC voltage, and a controller. The controller is configured to wirelessly connect to a mobile device to obtain a charging instruction identifying a donor vehicle and a beneficiary vehicle among the two vehicles, and responsive to the two charger connectors being coupled with the DC charge ports of the donor vehicle and the beneficiary vehicle, output a request for charging permission to a digital device associated with at least one of the vehicles. The controller is further configured to, responsive to receiving the charging permission, start a charging session by transferring electric charge from the donor vehicle to the beneficiary vehicle via the buck boost converter.

18 Claims, 3 Drawing Sheets

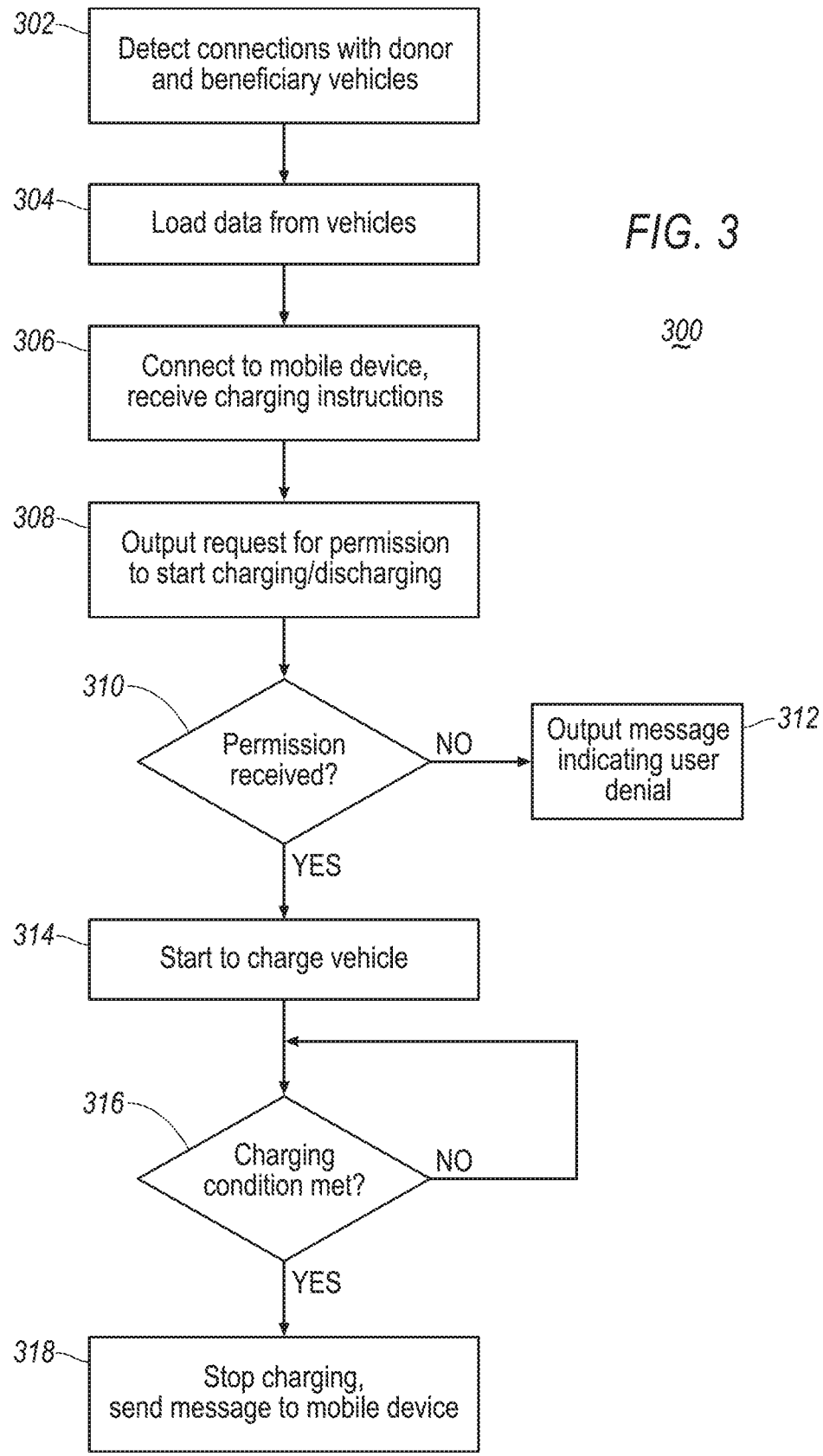

VEHICLE TO VEHICLE HIGH POWER CHARGING

TECHNICAL FIELD

The present disclosure relates to a high-power vehicle to vehicle charging system.

BACKGROUND

Certain electric vehicles (EVs) have become increasingly popular because they do not consume conventional fuel. An EV uses a high-voltage direct current (DC) battery (traction battery) connected to an electric machine to provide propulsion power. The traction battery may be recharged at a high-voltage DC charging station. Alternatively, some EVs may be charged via an alternating current (AC) power outlet such as a home power outlet.

SUMMARY

A vehicle charger includes two charge connectors configured to couple with DC charge ports of two vehicles each having a battery, a buck boost converter connected between the two charge connectors configured to convert a first DC voltage to a second DC voltage, and a controller. The controller is configured to wirelessly connect to a mobile device to obtain a charging instruction identifying a donor vehicle and a beneficiary vehicle among the two vehicles, and responsive to the two charger connectors being coupled with the DC charge ports of the donor vehicle and the beneficiary vehicle, output a request for charging permission to a digital device associated with at least one of the vehicles. The controller is further configured to, responsive to receiving the charging permission, start a charging session by transferring electric charge from the donor vehicle to the beneficiary vehicle via the buck boost converter.

A method for a vehicle-to-vehicle charger includes receiving, via a wireless transceiver, a charging instruction including identity information for at least one of a beneficiary vehicle or a donor vehicle, responsive to detecting a physical connection, via a first charge connector, to a first vehicle, and via a second charge connector, to a second vehicle, loading, via a controller, vehicle data from both the first and second vehicle via the charging connectors, identifying, via the controller, the vehicles as one being the donor vehicle and the other being the beneficiary vehicle using the identity information and the vehicle data, and responsive to successful identification of the donor and beneficiary vehicles, starting a charging session by outputting electric power received from the donor vehicle to the beneficiary vehicle.

A vehicle-to-vehicle charger includes a charging cable, two charge connectors connected at two ends of the charging cable, configured to couple with charge ports of a donor vehicle and a beneficiary vehicle each having a battery, a buck boost converter connected between the two charge connectors configured to convert a first voltage for the donor vehicle to a second voltage for the beneficiary vehicle, and a controller configured to wirelessly connect to a mobile device to obtain a charging instruction including a terminating condition, responsive to the two charger connectors being couple with the charge ports of the donor vehicle and the beneficiary vehicle, output a request for charging permission to a digital device associated with at least one of the vehicles, responsive to receiving the charging permission, start a charging session by transferring electric charge from the donor vehicle to the beneficiary vehicle via the buck boost converter, and responsive to detecting the terminating condition is met, terminate the charging session.

BRIEF DESCRIPTION OF THE DRAWINGS

FIG. 3 is a flow diagram for a process of the vehicle to vehicle charging system.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
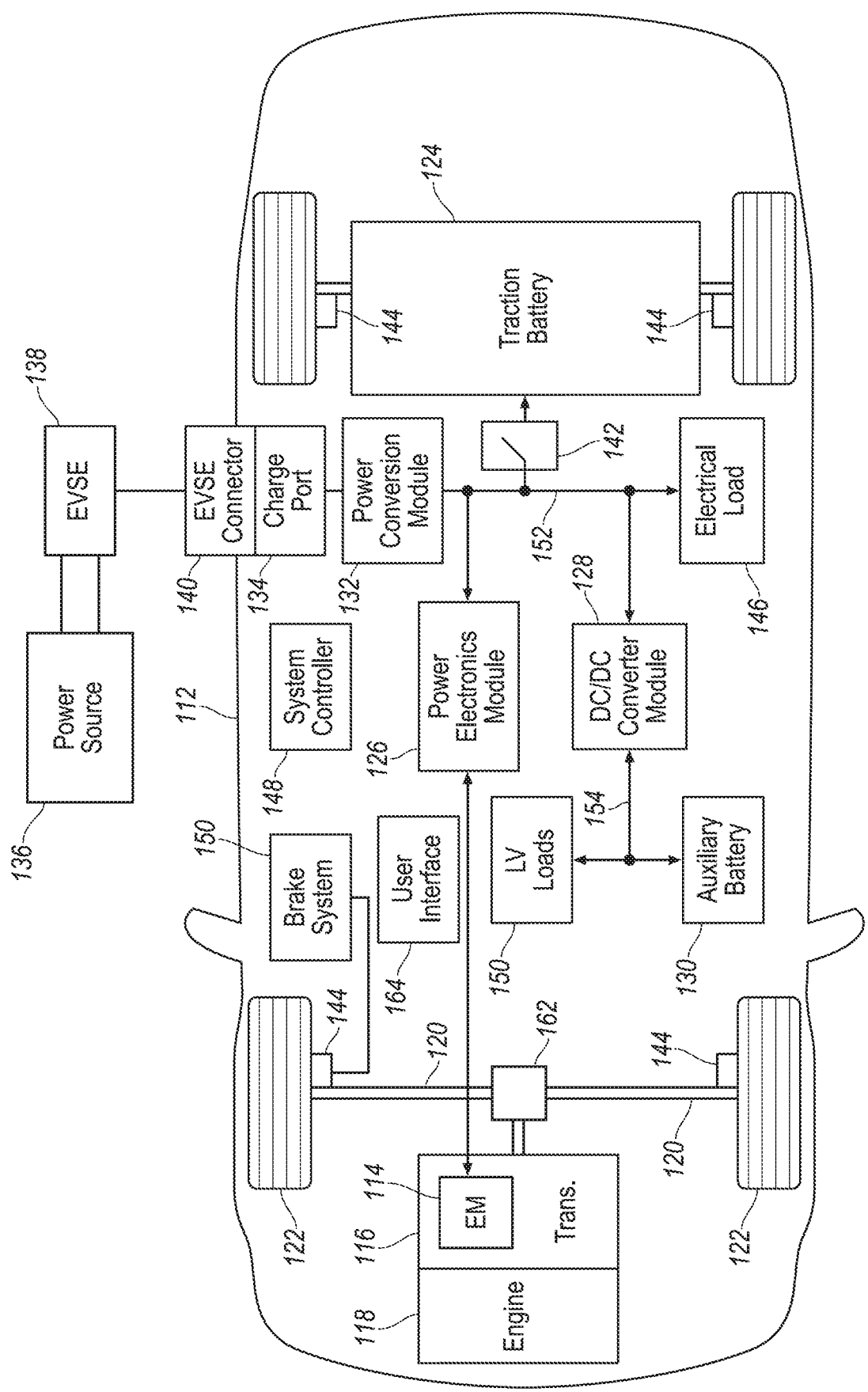
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV), a battery electric vehicle (BEV), and/or full hybrid electric vehicle (FHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a BEV. In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus/rail. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling. Additionally, the charge port 134 may be configured to output DC electric power from the traction battery 124 through the power conversion module 132.

One or more wheel brakes 144 may be provided for braking the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for slowing the vehicle. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
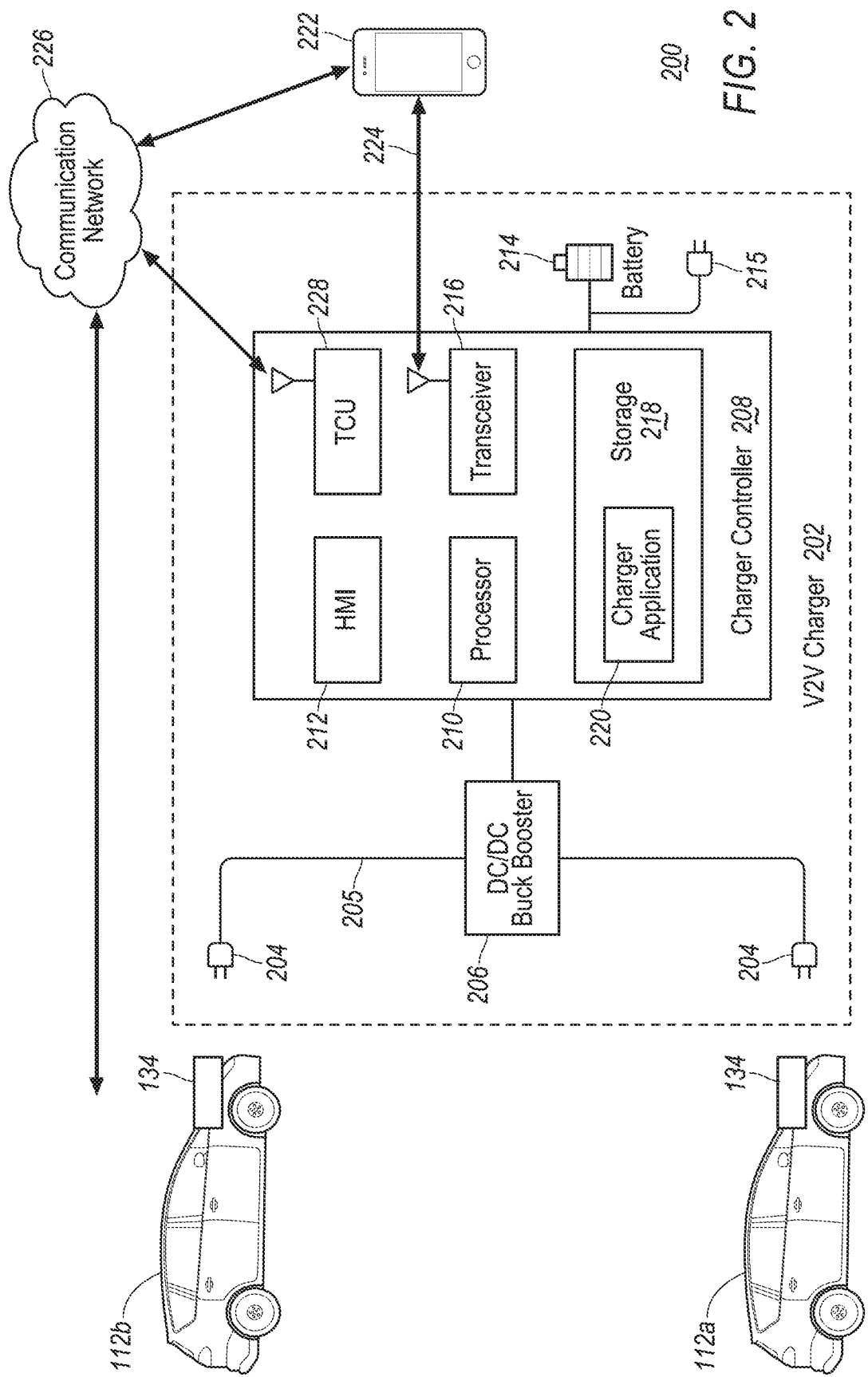
FIG. 2 is a schematic diagram of a vehicle to vehicle charging system.

FIG. 2 depicts a diagram of a vehicle-to-vehicle (V2V) charger 202. With continuing reference to FIG. 1, the V2V charger 202 may include two charge connectors 204 connected via a charge cable 205. Each of the connectors 204 may be adapted to couple with a charge port 134 of vehicles 112a and 112b. In the present example, the vehicles 112 may include a first vehicle (e.g. 112a) having a depleted battery (beneficiary vehicle) and a second vehicle (e.g. 112b) having sufficient battery state of charge (SOC) used to provide electric charge (donor vehicle). The charge connectors 204 may be configured to be substantially the same as the EVSE connector 140 in terms of shape and communication protocol to maximize compatibility with the charge port 134 of the vehicle 112. It is noted that the two connectors 204 of the V2V charger 202 may not be of the same type in some embodiments. This is due to the fact that different vehicle manufacturers may apply different types of charge port. The V2V charger 202 may be made with a variety of charge connector combinations to improve compatibility. Additionally, a connector adaptor (now shown) may be provided with the V2V charger 202 to further improve compatibility. While in use, the charge connector 204 may be coupled with the charge connector 134 via the adaptor. A DC-DC buck boost converter) 206 may be integrated with the charge cable 205 and configured to adapt an output voltage and current to accommodate various applications. Depending on the specific configuration, the donor vehicle 112b and beneficiary vehicle 112a may have different voltage and current input/output specifications. Even for vehicles with the same battery specification, the battery voltages may vary significantly due to different battery SOC. The buck boost converter 206 may be configured to communicate with each vehicle 112 and adaptively convert the voltage and current as required per the charge specification of both vehicles.

The buck boost converter 206 may be configured to communicate with a charger controller 208 configured to perform various control operations. The charger controller 208 may be integrated with the buck boost converter 206. For instance, both the buck boost converter 206 and the charger controller 208 may be integrated with one of the charge connectors 204. Alternatively, the charger controller 208 may be separated from the buck boost circuit 206. Under such a configuration, the buck boost converter 206 may be integrated with one charge connector 204 and the charger controller 208 may be integrated with the other charge connector to balance the weight and size. The charger controller 208 may be associated with various components to provide various operations. For instance, the charger controller 208 may include a processor 210 configured to perform instructions, commands and other routines in support of the processes described herein. The processor 210 may be configured to execute instruction of charger applications 220 to provide features such as communication and power conversion controls. Such instructions and other data may be maintained in a non-volatile manner using a variety of types of computer-readable storage medium 218. The computer-readable medium 218 (also referred to as processor-readable medium or storage) may include any non-transitory medium (e.g. tangible medium) that participates in providing instructions or other data that may be read by the processor 210. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The charger controller 208 may be further provided with various features allowing a user to interface with the V2V charger 202. For example, the charger controller 208 may receive input from human-machine interface (HMI) controller 212 configured to provide for user interaction with the V2V charger 202. As an example, the charger controller 208 may interface with one or more buttons or other input devices (not shown) configured to invoke functions on the V2V charger 202. The HMI controls 212 may be further configured to provide output to the user via an output device such as a display and/or speaker (not shown) to interact with the user. For instance, the display and speaker may be integrated with one of the charger connectors 204 coupled with input devices to provide the user with the capability to interact with the V2V charger 202. Additionally or alternatively, the user-charger interaction may be enabled through other means. The vehicles 112 may be provided with HMI controls and input/output devices (not shown). Communication between the vehicle 112 and the V2V charger 202 may be enabled by powerline communications (PLC) via the charger connectors 204. Each of the vehicle 112 and the V2V charger 202 may be provided with a PLC controller (not shown) configured to facilitate the communications. The user may interact with the V2V charger 202 through one or both of the vehicles 112. As an example, the V2V charging system may be configured to require an approval from the donor vehicle before being allowed to draw power from the traction battery of the donor vehicle. In this case, the user may be required to make an input through the HMI controls of the donor vehicle 112b to proceed with the charging.

The charger controller 208 may be further configured to wirelessly communicate with a mobile device 222 associated with a user via a wireless connection 224. The mobile device 222 may be any of various types of portable computing devices, such as cellular phones, tablet computers, wearable devices, smart watches smart fobs, laptop computers, portable music players, or other device capable of communication with the charger controller 208. A wireless transceiver 216 may be in communication with a variety of communication controllers (not shown) and configured to communicate with a compatible wireless transceiver of the mobile device 222. For instance, the communication controllers of the charger controller 208 may include a Wi-Fi controller, a Bluetooth controller, a radio-frequency identification (RFID) controller, a near-field communication (NFC) controller, and other controllers such as a Zigbee transceiver, an IrDA transceiver, an ultra-wide band (UWB) controller or the like.

The mobile device 222 may be provided with processing and storage capability and configured to provide various features. For instance, the mobile device 222 may be provided with software associated with the V2V charger 202 and configured to interact with the V2V charger 202 using the software. The mobile device 222 may be further associated with the donor and/or beneficiary vehicles 112 via a communication network 226 such as a cellular network. For instance, the mobile device 222 associated with the donor and/or beneficiary vehicles 112 may remotely approve the charging operation by sending a command to the vehicles 112 via the communication network without requiring the user to be at the scene. Additionally, the charger controller 208 may be further provided with a telematics control unit (TCU) 228 configured to communicate with the mobile device 222 via a modem (not shown) through the communication network 226 to enable long distance communications. It is noted that the term communication network is used as a general term in the present disclosure and may include any computing network involving carriers, routers, computers, servers, controllers of the like configured to store data and perform data processing functions and facilitate communication between various entities.

The charger controller 208 of the V2V charger 202 may be powered directly through the battery 124 of the vehicle responsive to plugging the charger connector 204 into the charge port 134. Additionally or alternatively, the charger controller 208 may be provided with an independent power source such as a battery 214. The battery 214 may be a rechargeable battery (e.g. lithium-ion battery) configured to supply power to the charger controller 208 to enable functions such as wireless communications when the V2V charger 202 is not connected to any charge port. The battery 214 may be recharged using a vehicle battery 124 when one of the charge connectors 204 is plugged in a charge port 134 of the vehicles 112. Additionally or alternatively, the charger controller 208 may be provided with a low-voltage connector 215 configured to supply power to the charger controller 208 from a low-voltage source. For instance, the low-voltage connector 215 may include a 12V vehicle cigarette lighter power adaptor configured to be couple with a vehicle cigarette lighter socket to supply power to the charger controller 208. As another example, the low-voltage connector 215 may include vehicle low-voltage battery connectors (battery clamps) configured to couple with the auxiliary battery 130 to provide power supply.

Referring to FIG. 3, an example flow diagram for a V2V charging process is illustrated. With continuing reference to FIGS. 1 to 3, responsive to detecting each of the charge connectors 204 are connected to a vehicle 112 at operation 302, the charge controller 202 communicates with each vehicle 112 and load vehicle data relevant to the charging from each vehicle 112 at operation 304. The vehicle data as loaded may include various entries. As a few non-limiting examples, the vehicle data may include data related to the traction battery and charging specification of both vehicles 112 such as SOC, voltage, and charging/discharging power of traction batteries 124. The vehicle data may further include vehicle identification data such as vehicle identification numbers (VIN). The vehicle data may further include information for any mobile devices 222 associated with one or both vehicles 112 for communication and permission approval purposes.

At operation 306, the charger controller 208 connects to the mobile device 222 and receives charging instructions from the mobile device 222. As discussed above, the mobile device 222 may be identified by the vehicle data received from one of the vehicles 112. Alternatively, a user may manually operate the mobile device 222 to establish the wireless connection 224 with the V2V charger 202. Alternatively, the mobile device 222 may be previously paired with the charger controller 208 via the wireless transceiver 216 and the wireless connection may be automatically established upon the charger controller 208 being powered on. Additionally or alternatively, the charging instructions may be received from one of the vehicles 112 through the PLC connection via the charger connectors 204. Responsive to connecting the charger controller 208, the user may wirelessly set up the charging via a software interface of the mobile device 222. For instance, the user may identify the donor vehicle and beneficiary vehicle using the mobile device 222. Although the charger controller 208 may be configured to automatically identify the donor and beneficiary vehicle using the current battery charge (e.g. vehicle with higher SOC is the donor), the user may override the automatic identification based on specific need. For instance, the user may intend to transfer electric charge from the vehicle 112 with a lower SOC to the vehicle 112 with higher SOC. In this case, the user may manually set up the charging via the mobile device 222. Additionally, the software may allow the user to configure specific charging conditions such as charging speed and amount of charge to be transferred from the donor to the beneficiary vehicle. As an example, the user may not intend to completely deplete the donor vehicle battery during the V2V charging session. The software may allow the user to set up a cut off SOC threshold for the donor battery below which the V2V charging session will terminate. Alternatively, a cut off SOC threshold for the beneficiary vehicle above which the V2V charging session will terminate may be established.

Although using the mobile device 222 for setting up the charging may be handy and helpful, the set up may be performed without using the mobile device 222. For instance, the donor and/or beneficiary vehicle 112 may be provided with software in support of the V2V charging configuration. The user may use the vehicle software to perform the set up under substantially the same concept as discussed above. Alternatively, the user may perform the charging set up and configuration using the HMI controls 212 of the charger controller 208. As discussed previously, the HMI controls 212 may be in communication with input and output devices to facilitate the configuration of the V2V charging without the involvement of other entities.

Responsive to receiving the charging instructions, at operation 308, the charger controller 208 outputs a request for permission to start the charging session. The request may be output to the device with which the charging setup is previously performed, e.g. the mobile device 222. Alternatively, the request may be provided to both vehicles 112 to ask for permission via user input via HMIs of both vehicles. To further enhance the security, the charger controller 208 may send the request to a digital entity that is associated with the donor and/or beneficiary vehicle 112 as identified through the vehicle data previously loaded. For instance, the digital entity may be a second mobile device associated with the owner of the vehicle. The charger controller 208 may send the request to the digital entity via the communication network 226 through the TCU 228. Alternatively, the request may be sent via the vehicle 112 connected to the communication network 226 via a vehicle TCU (not shown). If the request is not received within a predefined time period (e.g. one minute) or the user denies the request, the process proceeds from operation 310 to operation 312 and the charger controller 208 outputs a message indicative of the user denial. The message may be output via the HMI controls 212, the vehicle HMI and/or the mobile device 222.

If, at operation 310, the charger controller 208 receives the user permission, the process proceeds to operation 314 and the charger controller 208 starts the electric power transfer using the configuration that is set up. As noted previously, the electric charge may be drawn from the donor vehicle and goes through the buck booster 206 for voltage conversion before being fed to the beneficiary vehicle. The charger controller 208 monitors the charging condition at operation 316 to determine if the condition has been met. Responsive to detecting the charging condition has been met (e.g. the cut off threshold is met), the process proceeds to operation 318 and the charger controller 208 stops the V2V charging session. Additionally, a message may be sent to the mobile device 222 to notify the completion of the charging. The charger controller 208 may be configured to send the notification message via the wireless connection 224 if the mobile device 222 is within the transmission range of the wireless transceiver 216. Alternatively, since the V2V charging session may take some time, the user may be away and beyond the range of the wireless connection 224 during the charging. The charger controller 208 may be further configured to send the notification message to the mobile device 222 via the communication network 226 through the TCU 228.

The operations of FIG. 3 may be applied to various situations. As an example, a user of the beneficiary vehicle 102a may detect a low SOC of the traction battery 124 and request roadside assistance using an application of a cell phone (not shown) connected to the communication network 226. Alternatively, in case the beneficiary vehicle 102a is provided with wireless connection capabilities, the roadside assistance request may be generated and sent to the communication network 226 directly from the beneficiary vehicle 102a. The roadside assistance request may include identification of the vehicle such as make, model, year, color or the like for easier identification. The identification may further include specific information such as VIN. The roadside assistance request may further include a location of the vehicle obtained using a location controller (e.g. GPS) of the vehicle 102a or the cell phone. The request may further include a payment authorization for a specific amount (e.g. $10 USD) for the service. Responsive to receiving the request, a service technician may respond by operating the donor vehicle 102b having sufficient battery charge to the location of the beneficiary vehicle 102a indicated in the request. The service technician may be associated with the mobile device 222 paired with the V2V charger 202 used for the assistance mission. Responsive to receiving the roadside assistance request, the mobile device 222 may process the request and provide instructions to the V2V charger 202 before arriving at the scene. For instance, identifications (e.g. VIN) of the beneficiary vehicle 102a may be provided to the V2V charger 202 in advance for identity verification upon being connected with the beneficiary vehicle 102a. The instructions provided from the mobile device may further include the amount of charge to be transferred based on the payment authorization from the beneficiary vehicle user. By providing identification and charging instructions in advance, misidentification of the vehicle may be avoided and processing time at the scene may be shortened.

Upon arriving at the scene, the service technician may get out from the donor vehicle 102b and connect the charge connectors 204 of the V2V charger 202 to charge ports 134 of the vehicles 112. Responsive to detecting the power connections, the charger controller 208 may power on and proceed with the power transfer. To further save processing time at the scene, the mobile device 222 of the technician may be configured to send an activation signal to the charger controller 208 to power it up responsive to detecting the location of the mobile device 222 is near the scene of the beneficiary vehicle 102a based on signals from the navigation and location controllers. The charger controller 208 may output a request for approval to start to charge from both the technician and the user of the beneficiary vehicle 102a. In the present example, since the technician is at the scene, the approval may be easily provided via the mobile device 222 and/or the donor vehicle 102b. If the user of the beneficiary vehicle 102a is also at the scene and the cabin of the beneficiary vehicle 102 is accessible, the approval may be provided via the HMI controls of the beneficiary vehicle. However, in case that the beneficiary vehicle user has left the scene after summoning the roadside assistance service, the HMI controls of the beneficiary vehicle 102a may be inaccessible to the technician. In this case, the request for approval may be sent to the user's cell phone via the communication network 226 for remote approval. Responsive to receiving approval from both parties, the charger controller 208 may start to discharge the donor vehicle 102b to charge the traction battery of the beneficiary vehicle 102a. The V2V charging session may terminate at any time responsive to the charger controller 208 detecting a disconnection of the charge connector 204 from either vehicle 112. Alternatively, the charger controller 208 may terminate the charge session responsive to the charging condition (e.g. amount of charge or time) being met. Since the V2V charging may take some time, it may be unnecessary for the technician or the vehicle user to wait at the scene. A message may be sent to both the mobile device of the technician and the cell phone of the vehicle user to inform the completion of the charging and ask them to come back to pick up the vehicles 112.

Control logic or functions performed by one or more controllers may be represented by flow charts or similar diagrams in any of the various figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle charger comprising:
   two charge connectors configured to couple with DC charge ports of two vehicles each having a battery;
   a buck boost converter connected between the two charge connectors configured to convert a first DC voltage to a second DC voltage; and
   a controller, configured to
      wirelessly connect to a mobile device to obtain a charging instruction identifying a donor vehicle and a beneficiary vehicle among the two vehicles, wherein the charging instruction includes an identification of the beneficiary vehicle,
      responsive to one of the charge connectors being coupled with the beneficiary vehicle, load vehicle data from the beneficiary vehicle and compare the vehicle data against the identification,
      responsive to the two charge connectors being coupled with the DC charge ports of the donor vehicle and the beneficiary vehicle, output a request for charging permission to a digital device associated with at least one of the vehicles, and
      responsive to receiving the charging permission, start a charging session by transferring electric charge from the donor vehicle to the beneficiary vehicle via the buck boost converter.

2. The vehicle charger of claim 1, wherein the charging instruction includes a terminating condition, and wherein the controller is further programmed to, responsive to detecting the terminating condition is met, terminate the charging session.

3. The vehicle charger of claim 2, wherein the terminating condition includes a cut off state of charge (SOC) of the battery of the donor vehicle.

4. The vehicle charger of claim 1, wherein the digital device is a cellular device, and wherein the controller is further configured to send the request for charging permission to the digital device via a cellular network.

5. The vehicle charger of claim 4, wherein the controller is further programmed to, responsive to a termination of the charging session, send a message to the digital device indicative of the termination of the charging session.

6. The vehicle charger of claim 1, wherein the controller is further programmed to, responsive to the two charge connectors being coupled with the donor and beneficiary vehicles, measure voltages of the batteries of both the donor and beneficiary vehicles, and output commands to control the buck boost converter based on the voltages.

7. The vehicle charger of claim 1, further comprising a rechargeable battery configured to supply power to the controller, wherein the controller is further programmed to charge the rechargeable battery using electric power from the donor vehicle.

8. The vehicle charger of claim 1, wherein the digital device is a human-machine interface (HMI) integrated with the donor vehicle, and wherein the controller is further configured to send the request for charging permission to the digital device via the charge connector coupled with the donor vehicle.

9. The vehicle charger of claim 1, further comprising an integrated input device, wherein the controller is further configured to, responsive to receiving a second charging instruction via the integrated input device, override the charging instruction received from the mobile device.

10. The vehicle charger of claim 1, further comprising an integrated output device, wherein the controller is further configured to, responsive to termination of the charging session, output a signal indicative of the termination of the charging session via the integrated output device.

11. The vehicle charger of claim 1, wherein the controller is further configured to, responsive to not receiving the charging permission within a predefined period of time, send a notification to the mobile device indicative of a lack of charging permission.

12. A method for a vehicle-to-vehicle charger, comprising:
   receiving, via a wireless transceiver, a charging instruction including identity information for at least one of a beneficiary vehicle or a donor vehicle, wherein the charging instruction includes an identification of the beneficiary vehicle;
   responsive to detecting a physical connection, via a first charge connector, to a first vehicle, and via a second charge connector, to a second vehicle, loading, via a controller, vehicle data from both the first and second vehicle via the charge connectors;
   identifying, via the controller, the vehicles as one being the donor vehicle and the other being the beneficiary vehicle using the identity information and the vehicle data; and
   responsive to successful identification of the donor and beneficiary vehicles, starting a charging session by outputting electric power received from the donor vehicle to the beneficiary vehicle; and
   converting, via a buck boost converter, a first voltage of the electric power from the donor vehicle to a second voltage adapted to charge the beneficiary vehicle.

13. The method of claim 12, wherein the charging instruction further includes a terminating condition, the method further comprising responsive to detecting the terminating condition is met, terminate, via the controller, the charging session.

14. The method of claim 13, wherein the terminating condition includes a cut off state of charge (SOC) of a battery of the beneficiary vehicle.

15. The method of claim 12, further comprising:
   outputting, via the controller, a request for charging permission to a digital device associated with at least one of the vehicles; and
   responsive to receiving the charging permission, permitting, via the controller, the starting of the charging session.

16. A vehicle-to-vehicle charger, comprising:
   a charging cable;
   two charge connectors connected at two ends of the charging cable, configured to couple with charge ports of a donor vehicle and a beneficiary vehicle each having a battery;
   a buck boost converter connected between the two charge connectors configured to convert a first voltage for the donor vehicle to a second voltage for the beneficiary vehicle; and
   a controller configured to
      responsive to the two charge connectors being coupled with the charge ports of the donor and the beneficiary vehicle, communicate with at least one of the donor or beneficiary vehicle using powerline communications to obtain a charging instruction including a terminating condition, start a charging session by transferring electric charge from the donor vehicle to the beneficiary vehicle via the buck boost converter, and responsive to detecting the terminating condition is met, terminate the charging session, wherein the charging instruction includes an identification of the beneficiary vehicle, and wherein the controller is further programmed to, responsive to one of the charge connectors being coupled with the beneficiary vehicle, load vehicle data from the beneficiary vehicle and compare the vehicle data against the identification.

17. The vehicle-to-vehicle charger of claim 16, wherein the controller is further configured to send a request for charging permission to a digital device associated with at least one of the vehicles via a cellular network; and receive the charging permission from the digital device.

18. The vehicle-to-vehicle charger of claim 16, wherein the charging instruction further includes identity information of a donor vehicle and a beneficiary vehicle, and wherein the controller is further programmed to, responsive to the two charge connectors being coupled with the donor and beneficiary vehicles, load vehicle data from both vehicles and match the identity of each vehicle using the identity information.

* * * * *